(12) United States Patent
Ramos Carneiro

(10) Patent No.: US 9,779,227 B1
(45) Date of Patent: Oct. 3, 2017

(54) SECURITY SYSTEM USING KEYS ENCODED IN HOLOGRAMS

(71) Applicant: Amazon Technologies, Inc., Seattle, WA (US)

(72) Inventor: Steven Ramos Carneiro, Eindhoven (NL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 346 days.

(21) Appl. No.: 14/523,664

(22) Filed: Oct. 24, 2014

(51) Int. Cl.
| | |
|---|---|
| *H04L 9/08* | (2006.01) |
| *G06F 21/34* | (2013.01) |
| *G06F 21/36* | (2013.01) |
| *G06F 7/76* | (2006.01) |
| *G03H 1/28* | (2006.01) |

(Continued)

(52) U.S. Cl.
CPC ............ *G06F 21/34* (2013.01); *G03H 1/26* (2013.01); *G03H 1/28* (2013.01); *G06F 7/764* (2013.01); *G06F 21/36* (2013.01); *H04L 9/085* (2013.01); *G03H 2001/303* (2013.01)

(58) Field of Classification Search
CPC .... G03H 2001/2284; G03H 1/22; G03H 1/26; G03H 1/2645; G03H 1/265; G03H 2001/2625; G03H 1/2605; G03H 1/261; G03H 1/266; G06F 7/76; G06F 7/764; G06F 7/768; G06F 21/36; H04L 9/085; H04L 9/0888
See application file for complete search history.

(56) References Cited

U.S. PATENT DOCUMENTS 3,914,877 A * 10/1975 Hines ................. G07C 9/00055
380/54
4,120,559 A * 10/1978 Abramson ............. G06K 1/126
356/457
(Continued)

OTHER PUBLICATIONS

Tao, "A Practical Holographic Encryption/Decryption Technique," in Biomedical Optics and 3-D Imaging, OSA Technical Digest (Optical Society of America, 2012), paper JM3A.57, from internet at http://www.opticsinfobase.org/abstract.cfm?URI=DH-2012-JM3A.57, 1 page, 2012.

(Continued)

*Primary Examiner* — Tae Kim
(74) *Attorney, Agent, or Firm* — Davis Wright Tremaine LLP

(57) ABSTRACT

A system for controlling access to secured resources using a security token having a hologram embossed thereon is provided. A key is split into a user key and a complimentary key based on a mask, wherein key values in the user key correspond to idle state values in the complimentary key and vice versa. The user key is used to generate a user key array, that is used to generate a three-dimensional virtual image that is holographically embossed onto a security token. The hologram is merged with a corresponding hologram for the complimentary key and the combination compared to an image of an ensemble of the key. The combination can be mergers of images or extractions of holograms. If a match is found, within a tolerance, an access grant signal is sent to the secure resources, thereby securing the resources based on presence of the security token.

19 Claims, 10 Drawing Sheets

(51) Int. Cl.
*G03H 1/26* (2006.01)
*G03H 1/30* (2006.01)

(56) References Cited

U.S. PATENT DOCUMENTS

| | | | | |
|---|---|---|---|---|
| 4,140,373 | A * | 2/1979 | Rull | G03H 1/28 |
| | | | | 283/70 |
| 5,511,058 | A * | 4/1996 | Visel | G03H 1/22 |
| | | | | 359/3 |
| 5,715,316 | A * | 2/1998 | Steenblik | G09C 5/00 |
| | | | | 273/157 A |
| 5,740,276 | A | 4/1998 | Tomko et al. | |
| 5,940,514 | A | 8/1999 | Heanue et al. | |
| 6,570,708 | B1 * | 5/2003 | Bergeron | G02B 27/46 |
| | | | | 359/558 |
| 7,044,395 | B1 * | 5/2006 | Davis | G06T 1/0064 |
| | | | | 235/494 |
| 7,945,784 | B1 * | 5/2011 | Masinter | H04L 9/085 |
| | | | | 380/28 |
| 8,625,181 | B2 * | 1/2014 | Holmes | G03H 1/028 |
| | | | | 283/85 |
| 2001/0036275 | A1 * | 11/2001 | Murakami | H04L 9/0847 |
| | | | | 380/277 |
| 2003/0039195 | A1 * | 2/2003 | Long | G03H 1/041 |
| | | | | 369/103 |
| 2003/0070075 | A1 * | 4/2003 | Deguillaume | G06T 1/0042 |
| | | | | 713/176 |
| 2003/0101346 | A1 * | 5/2003 | Barron | H04L 9/0827 |
| | | | | 713/175 |
| 2004/0117627 | A1 * | 6/2004 | Brewington | H04N 1/32133 |
| | | | | 713/176 |
| 2005/0129281 | A1 * | 6/2005 | Ashizaki | G03H 1/268 |
| | | | | 382/112 |
| 2006/0115082 | A1 * | 6/2006 | Kevenaar | G07D 7/0053 |
| | | | | 380/216 |
| 2006/0256963 | A1 * | 11/2006 | Gebotys | H04L 9/003 |
| | | | | 380/205 |
| 2007/0103746 | A1 * | 5/2007 | Molteni | B44F 1/10 |
| | | | | 359/7 |
| 2007/0127096 | A1 * | 6/2007 | Larsen | G03H 1/0005 |
| | | | | 359/2 |
| 2007/0174854 | A1 * | 7/2007 | Jungermann | G06K 19/06009 |
| | | | | 720/600 |
| 2008/0029602 | A1 * | 2/2008 | Burian | G06K 7/10722 |
| | | | | 235/462.09 |
| 2008/0301767 | A1 * | 12/2008 | Picard | G06T 1/0042 |
| | | | | 726/2 |
| 2008/0313395 | A1 * | 12/2008 | Bates | G03H 1/02 |
| | | | | 711/112 |
| 2010/0008505 | A1 * | 1/2010 | Bai | H04L 9/085 |
| | | | | 380/255 |
| 2010/0172501 | A1 * | 7/2010 | Tian | G06Q 20/02 |
| | | | | 380/277 |
| 2010/0328741 | A1 * | 12/2010 | Cheverton | G03H 1/0011 |
| | | | | 359/2 |
| 2011/0069596 | A1 * | 3/2011 | Martin | G03H 1/18 |
| | | | | 369/103 |
| 2011/0188102 | A1 * | 8/2011 | Shirakura | G03H 1/0011 |
| | | | | 359/2 |
| 2011/0309146 | A1 * | 12/2011 | Zazzu | G06K 19/16 |
| | | | | 235/440 |
| 2012/0060033 | A1 * | 3/2012 | Giuliani | H04L 9/085 |
| | | | | 713/168 |
| 2012/0121088 | A1 * | 5/2012 | Hata | H04L 9/0836 |
| | | | | 380/255 |
| 2013/0163897 | A1 * | 6/2013 | Vizdal | G03H 1/02 |
| | | | | 382/284 |
| 2014/0065520 | A1 * | 3/2014 | Tsang | G03H 1/02 |
| | | | | 430/2 |
| 2014/0173270 | A1 * | 6/2014 | Matsuo | H04L 9/0869 |
| | | | | 713/150 |
| 2014/0341374 | A1 * | 11/2014 | Thozhuvanoor | H04L 9/0869 |
| | | | | 380/28 |
| 2015/0169904 | A1 * | 6/2015 | Leiserson | G06F 21/71 |
| | | | | 713/189 |
| 2015/0378842 | A1 * | 12/2015 | Tomlinson | G06F 21/40 |
| | | | | 380/28 |

OTHER PUBLICATIONS

Widjaja, "Holographic image encryption using random phase mask," Proc. SPIE 7851, Information Optics and Optical Data Storage, 785108, Nov. 16, 2010, from internet at doi:10.1117/12.872728; http://dx.doi. org/10.1117/12.872728.

Yuan, et al., Hybrid encryption and decryption technique using microfabricated diffractive optical elements, Opt. Eng. 43(11):2493-2494, from internet at http://dx.doi.org/10.1117/1.1802272, Nov. 1, 2004.

Zhang, "A 3-D Encryption Technique Using Computer-Generated Hologram," IEEE Xplore Abstract, Key Lab of Nondestructive Test of Minist. of Educ. of China, Nanchang Hangkong Univ., Nanchang, ICESS Symposia 2008 International Conference of Jul. 29-31, 2008, 2 pages.

\* cited by examiner

SUPERPOSITION TYPES AND OPERATIONS

| Form of Each of User Key and Complimentary Key | Superposition Process | Individual Superposition Operations | Result |
|---|---|---|---|
| String of 27 elements from alphabet {0, 1, ?} | Bitwise Combine Along String Position | 0 + ? = 0<br>1 + ? = 1<br>? + 0 = 0<br>? + 1 = 1 | String of 27 elements from alphabet {0, 1} |
| 3x3x3 array of values from the alphabet {0, 1, ?} | Bitwise Combine Along 3D Position | 0 + ? = 0<br>1 + ? = 1<br>? + 0 = 0<br>? + 1 = 1 | 3x3x3 array of values from the alphabet {0, 1} |
| An image in a 3d virtual space of objects that are white, black or an idle state (IS) | Geometric Model Object Combination | White Cube + IS = White Cube<br>Black Cube + IS = Black Cube<br>IS + White Cube = White Cube<br>IS + Black Cube = Black Cube | An image in a 3D virtual space of white/black objects, w/no idle states |
| A 3D array of voxel values of size corresponding to an image resolution | Voxel Superposition | Voxel-by-voxel combination from a rasterized 3D image of white/black objects and idle states | A 3D array of voxel values of size corresponding to an image resolution |
| Hologram of image of 3D array of objects selected from {white object, black object, no object/idle state} | Optical Overlay | n/a (Imagery taken from both holograms is combined optically in one pass.) | Hologram of image of 3D array of objects selected from {white object, black object} |

FIG. 7

SECURITY SYSTEM USING KEYS ENCODED IN HOLOGRAMS

BACKGROUND

Security procedures are sometimes necessary to secure access and/or resources. In some instances, access to those secure areas or resources is conditioned on possession of secret information, such as a key. Thus, when a machine, such as a card reader securing a door reads a card or device inserted by a visitor, the machine reads the key from the card, does some processing and/or data look-up, and based on that determines whether to issue an "access grant" signal. A possessor of a validated key would be granted access, while others (presumably unauthorized visitors) would not be granted access. The access can be physical access to secured locations, access to data that is secured, or some other access.

Such security procedures should be not too complex, but should be reliable, versatile, and should operate with low delays.

BRIEF DESCRIPTION OF THE DRAWINGS

Various embodiments in accordance with the present disclosure will be described with reference to the drawings, in which:

FIG. 7 is a table illustrating different types of superposition that might be used in a security system to merge split keys.

DETAILED DESCRIPTION

Figure 1:
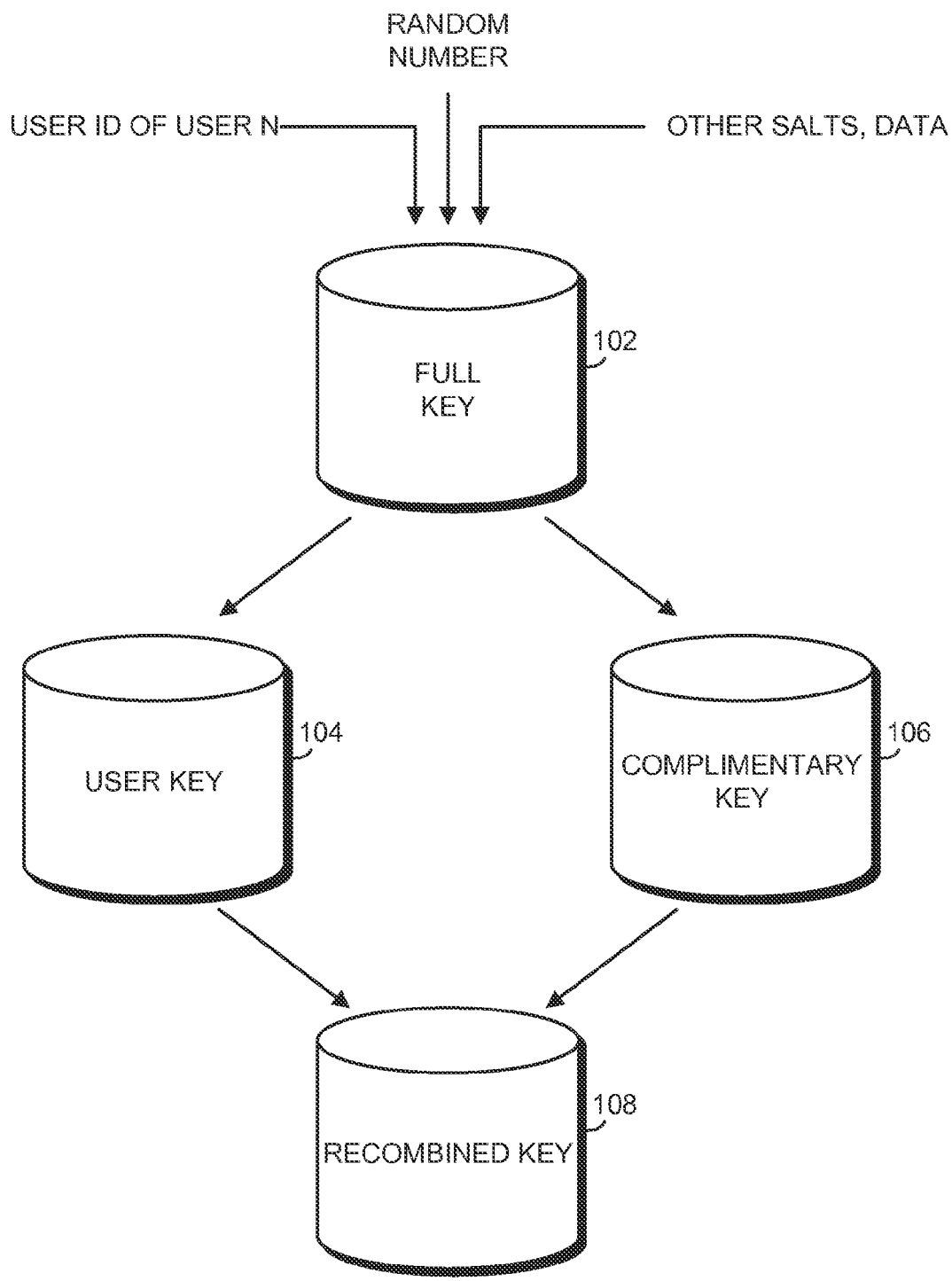
FIG. 1 illustrates various keys as might be used by systems described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As explained below in detail, access to secured resources can be controlled based on possession of a card or other media (a "security token") containing the appropriate key in the form of a hologram of a 3D image corresponding to a 3D array of values. In a verification process, the key presented by or to a reading device that reads the security token is combined with other data and then compared with a pre-stored combination. If the combination matches the pre-stored combination, exactly or within an allowed tolerance, the key extracted from the hologram is presumed to be a correct key. The key presented for verification may be a portion of a larger key.

Techniques described and suggested herein include the use of holograms and 3D images in a security system as might be used in a system for securing physical access against unauthorized access while allowing for authorized access. Whether a person has authorization for the access might be based on whether that person has possession of a key in the form of data stored as a hologram. That access might be to a secured physical location, such as a secure server room, a secure building, a safe, or the like. That access might also be to secured information or control, such as secured access to data such that the data is easily readable by a device that is granted access and not easily readable by a device that is not granted access, or the ability of a device that is granted access to easily send commands to a controlled device, such as a printer, communication device, resource allocator or the like, while making it impossible (or at least very hard) for a device that is not granted access to do the same.

In many cases, a system is considered secure even if it is not impossible to crack. In fact, most secured systems secured by digital keys may be hacked or cracked given a sufficiently large budget and enough time. So long as the system is designed so that there is a very low probability that an attacker would have enough resources to mount an attack that would complete within a time window smaller than the time window the system is secured for, the system is considered secure. For example, if there is less than one chance in 10^12 that an attacker with $1 billion to spend on an attack could breach the security on a bank account with under $1 million on deposit within 10 years of beginning the attack, it would normally be considered secure. If there is a 1 in 10 chance that the attacker could break into that bank account by spending only $10,000 on cracking hardware and software, but it would take an estimated 100,000 years to get to that 1 in 10 chance, the system would normally be considered secure. If the attacker has the facility to try a different password once per second, all possible 16-bit passwords can be tried and so the attacker has a 100% chance of guessing the password correctly in less than a day.

As a result, when discussing the security of a system or technique, it is less important to design it to be completely impenetrable than it is to design it so that the amount of effort is larger than some threshold and that threshold is a larger amount of effort that an attacker would find useful. That threshold varies based on what is being secured. The threshold for cracking a vending machine to steal a sandwich might be less than one month, since it is a waste of time to crack a vending machine to steal on average a 15 day old sandwich. However, the threshold amount of effort to defend against cracking a national security facility or a bond trading desk should probably be more than one month's worth of attacking effort.

These concepts are explained in more detail below with reference to the figures.

Figure 2:
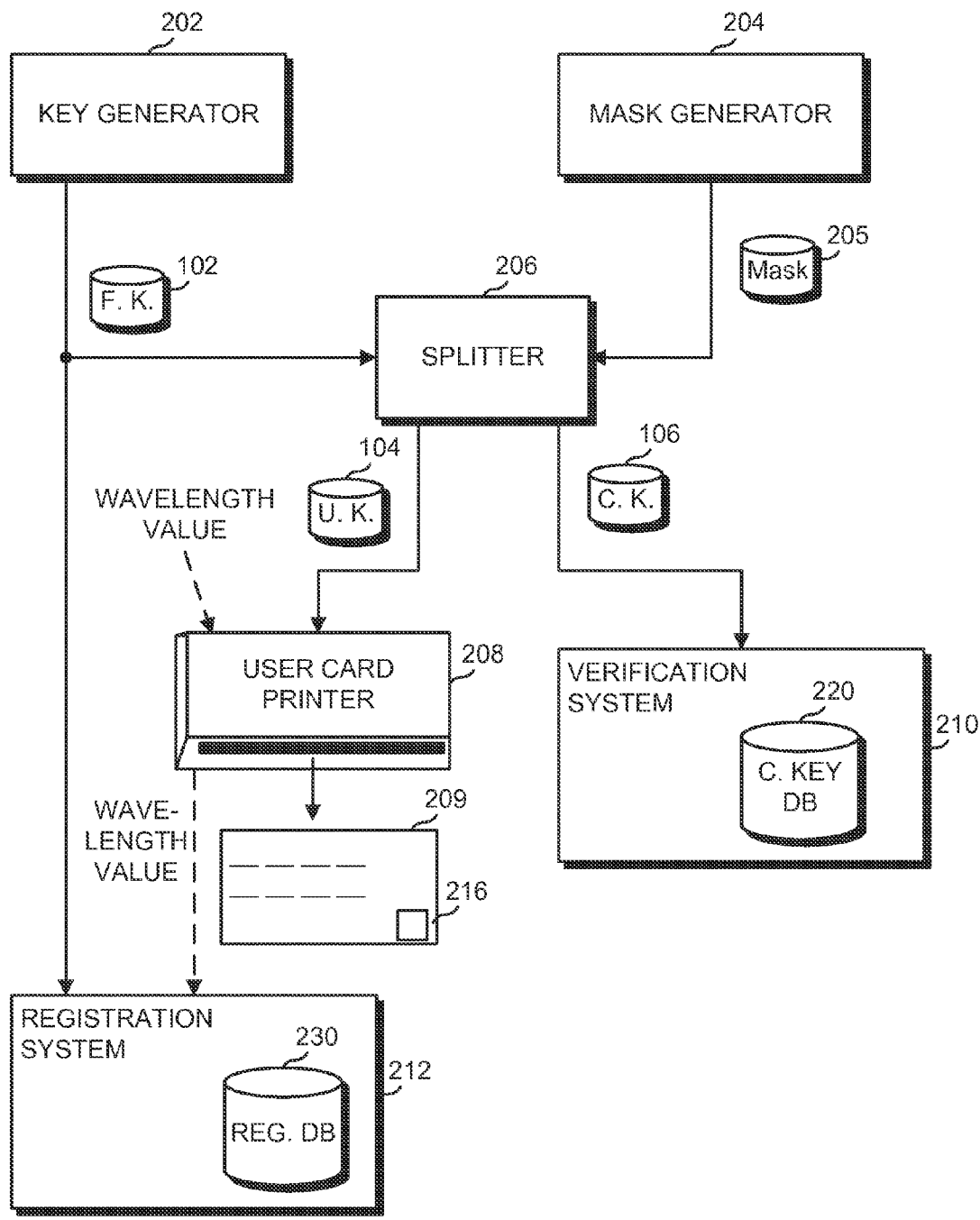
FIG. 2 illustrates a system and process that might be used to initialize an access system using those various keys.
Figure 3:
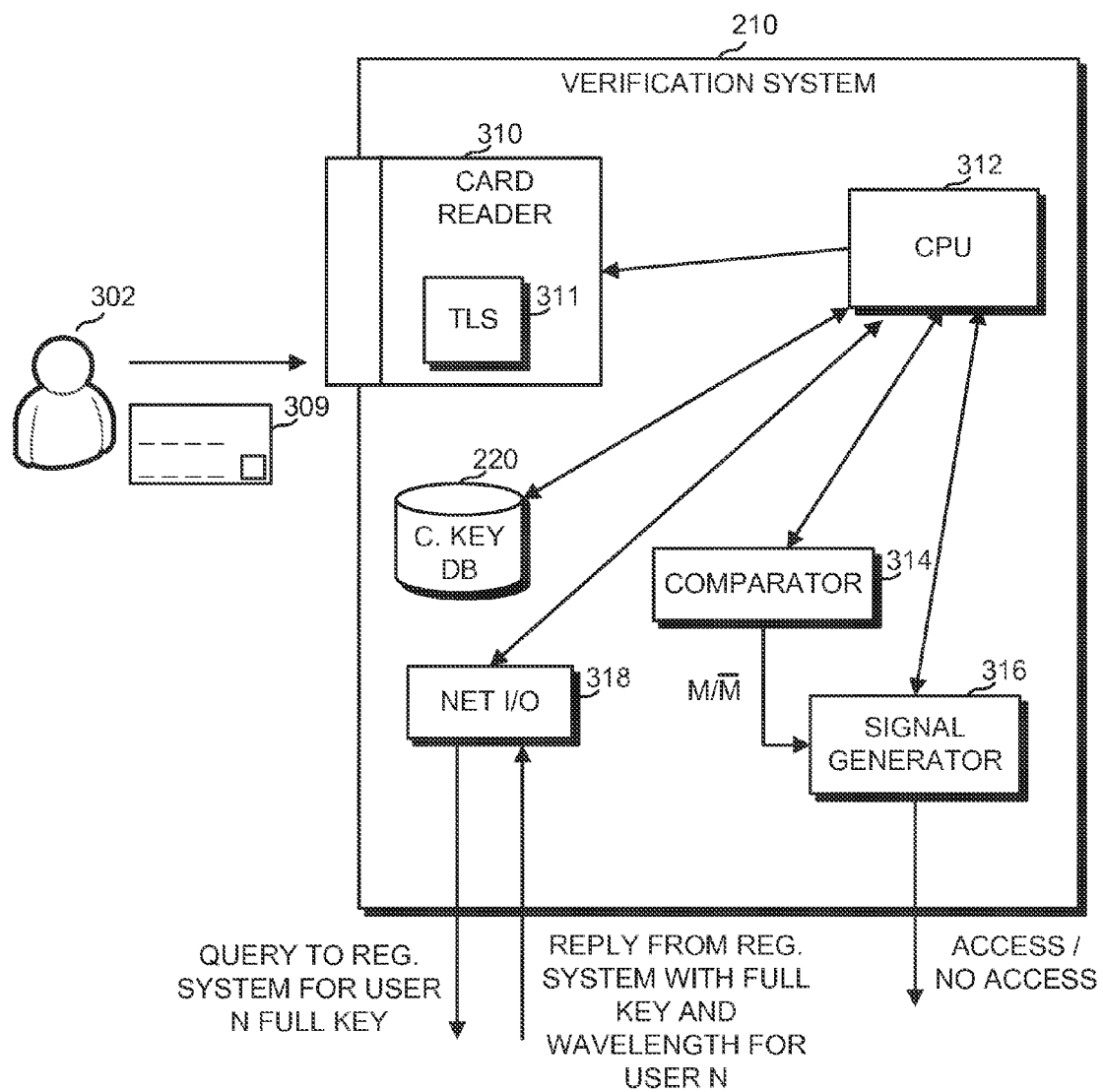
FIG. 3 illustrates a verification system and process that might be used for access control involving that security token and the various keys.

FIG. 1 illustrates various keys as might be used by systems described herein, FIG. 2 illustrates a system and process that might be used to initialize an access system using those various keys so that a new user gets a security token that can be verified for access control purposes, and FIG. 3 illustrates a verification system and process that might be used for access control involving that security token and the various keys.

In FIG. 1, a full key 102, a user key 104, a complimentary key 106, and a recombined key 108 are shown. The generation and use of those various keys is explained below in greater detail. Full key 102 is a key generated for a specific user, referred to in the figure as User N. Full key 102 is generated from a user ID of User N, a random number, and optionally from other salts and data as might be suitable for a particular application. The random number might be a number generated by a random or pseudorandom number generator. In other variations, different data is used in the generation of full key 102, but in any case, full key 102 is associated with User N.

Also as explained in more detail below, full key 102 is stored in a suitable secure repository and a copy of full key 102 is split into user key 104 and complimentary key 106. User key 104 and complimentary key 106 can be combined, as explained below, to form recombined key 108. Recombined key 108 and full key 102 can be compared to determine whether to allow User N access to secured resources.

The keys (e.g., full key 102, user key 104, complimentary key 106, and recombined key 108) can be represented by a sequence of symbols, where each symbol has a position value within the sequence and a data value selected from an alphabet of possible symbols. Where a key is strictly a binary sequence, the key might be a sequence of bits of the set {0, 1}. In some of the examples used herein, the key is a sequence of bits, possibly including "idle elements" that are neither "0" nor "1". In those cases, a key is a sequence of symbols where the symbols are members of the set {0, 1, ?}. There, "0" and "1" correspond to bit values and "?" corresponds to an "idle state" value. The idle state value at a position in the sequence can be used to indicate that the bit at that position is not necessarily a "0" or a "1" but is indicative of the absence of one of those two values, an "idle state", "don't know", "unknown", "don't care", "masked", or the like. As explained herein, keys such as user key 104, complimentary key 106, and recombined key 108 might have idle state values in their sequences. For clarity of explanation herein, unless otherwise indicated, the examples will use bit sequences and sequences of members of the set {0, 1, ?}.

The length of the sequence that forms a key can be determined by the appropriate application and use. The length is preferably long enough to dissuade brute force attacks testing all possible sequences. When being processed or operated upon by a processor, a bit sequence for a key might be stored in memory locations and sequences of members of the set {0, 1, ?} might be stored in memory with three possible values at each memory location or stored in memory with binary values at each memory location and a mask indicating which ones of those binary value positions are actually "?" elements (e.g., idle state values).

In an access verification process, full key 102 is stored securely, user key 104 is stored in some fashion, such as methods described herein, on a security token to be given to User N, and complimentary key 106 is stored in a verification system. When the security token is provided to the verification system such that the verification system can read the user key, the verification system can combine user key 104 and complimentary key 106 into recombined key 108. The verification system can then obtain a copy of full key 102 from where it was stored and compare recombined key 108 and full key 102. If there is a match, the verification system can issue an access message to the secured resource or other destination, otherwise deny access.

In some security systems, the user key is further subdivided so that more than one user is required to provide an access card to form a match.

FIG. 2 illustrates a system and process that might be used to initialize an access system and initializing an access system for a new user. FIG. 2 also shows a block diagram of portions of an access control that generate keys, images and other elements used by a security system including holograms that encode the keys. Some components shown in FIG. 2 include a key generator 202, a mask generator 204, a splitter 206, a user card printer 208, a verification system 210, and a registration system 212. Each of these elements might be implemented in hardware, software, firmware, or a combination, as well as other electronic elements, and are described in more detail below.

An example initialization operation to generate a security token for User N will now be explained. The operation of creating these security tokens (of which an access card 209 is shown as an example) can be repeated any number of times to generate security tokens for more than one user or to generate replacement or duplicate security tokens for users. It should be noted herein that examples and explanations with respect to access cards apply equally to other types of security tokens, unless otherwise indicated.

Optionally, each user has an assigned unique user identifier ("user ID"). This user ID might be used throughout the access control system as a unique identifier of that user. The user ID might be generated by a software program or assigned by an administrator. The user ID might be conveyed and processed as an integer, a string, or other data structure as understood by various components of the access system.

The user ID of User N is provided to key generator 202 and mask generator 204 at the outset of an initialization operation along with a signal to trigger their respective generation operations. Key generator 202 generates full key 102 for User N. When full key 102 is stored or communicated, it might include metadata such as the user ID associated with that key and possibly other fields of data related to full key 102. Key generator 202 might supply the generated full key 102 to registration system 212. If the user ID metadata for the key is not available to registration system 212, key generator 202 might separately send the user ID to registration system 212, to allow registration system 212 to store full key 102 in association with its associated user ID.

Mask generator 204 generates a mask for User N. In some embodiments, all users get the same mask or at least multiple users get the same mask, but in many instances, the access control system can be made more secure by having each user have a distinct mask. The mask can be a sequence of members of the set {0, 1, ?} having the same length sequence as full key 102.

The mask is used by splitter 206 to split full key 102 into user key 104 and complimentary key 106, as illustrated in FIG. 1. For example, mask 205 might have the same length as full key 102. Splitter 206 considers the values in mask 205. If the first (in sequence) value in mask 205 is "0", the first value of user key 104 is set to the first value of full key 102 and the first value of complimentary key 106 is set to the "?" (idle state) value. If the first value in mask 205 is "1", the first value of user key 104 is set to the "?" (idle state) value and the first value of complimentary key 106 is set to the first value of full key 102. If the first (in sequence) value in mask 205 is "?", the first value of user key 104 is set to the first value of full key 102, both the first value of user key 104 and the first value of complimentary key 106 are both set to the "?" (idle state) value. Splitter 206 continues this process until user key 104 and complimentary key 106 are generated (split) from full key 102 according to mask 205.

Splitter 206 may be program instructions, logic, etc. that receives full key 102 from key generator 202 and a mask 205 from mask generator 204 and then provides user key 104 to user card printer 208 and complimentary key 106 to verification system 210.

User card printer 208 might be a holographic printer that can accept user key 104, perform some computations and create or form a corresponding hologram (such as using methods described elsewhere herein) onto a holographic substrate 216 on access card 209. In one embodiment, user key 104 is represented in an image of a virtual ensemble of objects that are positioned in a coordinate system of a virtual 3D space according to the sequence of values of user key 104. Holographic substrate 216 might be permanently attached to access card 209 or other security token, but holographic substrate 216 might be removably attached, attachable, enclosable or the like.

User card printer 208 or other hologram generator might expose holographic substrate 216 such that user key 104 is imaged with a particular light wavelength. The particular wavelength used might vary from user to user, might be a function of the user ID, randomly determined, or otherwise determined. Knowing that wavelength, user card printer 208 can convey a value of that wavelength to registration system 212. This step might be optional, if registration system 212 can compute the wavelength value from full key 102 or other information registration system 212 already has.

Verification system 210, upon receipt of complimentary key 106, from splitter 206 or otherwise, can store that key into a complimentary key database 220. In some implementations, complimentary key database 220 uses memory or digital media to store complimentary key 106 along with other users' complimentary keys, while in other implementations, the complimentary keys are represented in an image of a virtual ensemble of objects that are positioned in a coordinate system of a virtual 3D space according to the sequence of values of the various complimentary keys. It may be that a hologram of an image corresponding to each complimentary key is formed on a holographic substrate using different angles, wavelengths or other holographic parameters, so that individual complimentary keys can be read from the holographic substrate.

Once the hologram is embossed onto holographic substrate 216 of access card 209, then access card 209 can be provided to User N (the user associated with that card for use in secure access, as explained herein). At this point, User N would be in possession of access card 209 and thus be able to supply holographic substrate 216 at an access control point or other user card scanner.

The steps described above with reference to FIG. 2 can be repeated for multiple users. Thus, multiple users would possess their specific access card having a hologram thereon that encodes their specific user keys using particular wavelengths associated with those users, verification system 210 would have stored therein multiple complimentary keys of those users and registration system 212 would have stored therein the full keys of each of the users processed through the system, perhaps storing them in a database 230. Verification system 210 can have those complimentary keys stored as data in a digital database or can have those complimentary keys represented by holograms, either as holographically recorded data or as holograms of virtual images of ensembles of objects positioned in a co-ordinate system of a virtual 3D space.

FIG. 3 illustrates verification system 210 shown in FIG. 2 in more detail. Illustrated there in FIG. 3 is verification system 210 including a hologram reader such as card reader 310 that uses a tunable laser source ("TLS") 311, a processor 312, a comparator 314, a signal generator 316, and network I/O interface 318. When a user 302 presents an access card 309 to card reader 310, card reader 310 illuminates the hologram on access card 309 with a particular wavelength of light, using TLS 311. Card reader 310 might also include optics as needed, and a sensor, such as a CCD, senses light emitted via the hologram, digitizes the results (such as by using conventional techniques) and provides those to processor 312.

Where card reader 310 does not know in advance what light wavelength was assigned to user 302, card reader 310 can scan TLS 311 over a range of possible wavelengths until card reader 310 determines that a readable image pattern is available. That readable image pattern is typically available when the TLS scans through the light wavelength assigned to user 302. Alternatively, the light wavelength assigned to user 302 might be determinable from user 302's user ID or other methods. In other implementations, the TLS might not be necessary. Other types of light sources might be used.

Operations of verification system 210 might be handled by a processor 312 programmed with the appropriate instructions. For example, processor 312 might run a program that cycles through a range of light wavelength values, perhaps incrementing from a minimum value to a maximum value by a step value in each iteration of a loop, sending a current wavelength value to card reader 310, checking the output of card reader 310 for a viable image pattern, and looping until a viable image is detected. At that point, processor 312 would know the wavelength used and would know the user key recorded at that wavelength.

Processor 312 is also able to read complimentary keys from complimentary key database 220, merge the user's complimentary key with the obtained user key to form a recombined key, send queries to a registration system to obtain the full key for user 302, and instruct a comparator 314 to compare the recombined key with the retrieved full key. Comparator 314 provides a match/no match signal to signal generator 316, which in turn outputs a signal indicating whether to allow user 302 access to resources.

Processor 312 might handle various interprocess communication and coordination, as needed, using a network I/O interface 318 or other methods. For example, processor 312 might receive a signal upon detection that a card is inserted into card reader 310 and then initiate some responsive program steps, as might be enacted in computer program instructions stored in a program code storage accessible to processor 312.

The matching done by comparator 314 need not be exact. For instance, a 90% to 97% alignment of the recombined key and the retrieved full key might be deemed sufficient to signal a match.

The access signal can be in the form of electrical pulses, messages or other signals.

Figure 4:
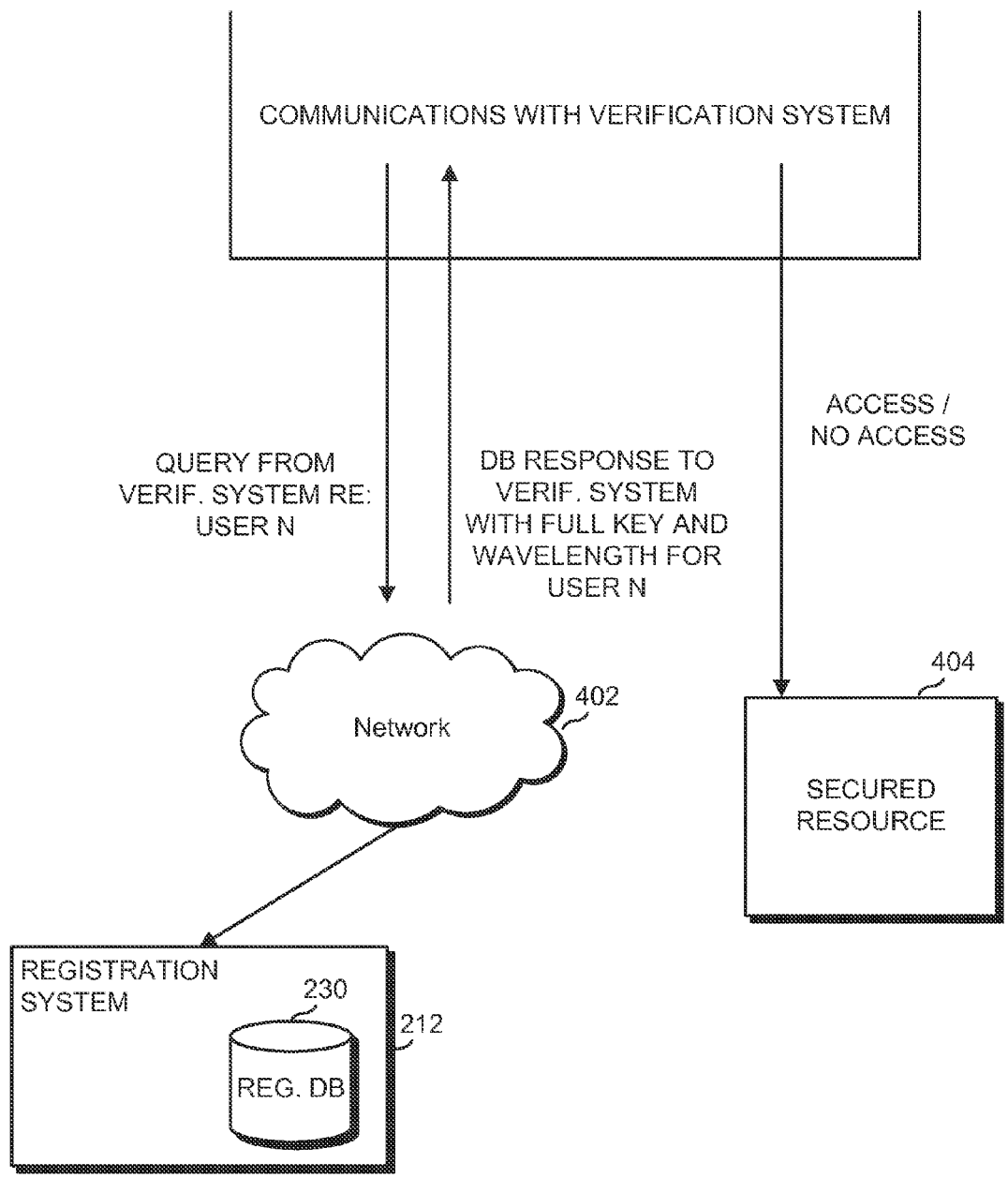
FIG. 4 illustrates an example of interactions that might occur with a verification system and other elements.

FIG. 4 illustrates an example of interactions that might occur with a verification system and other elements. The verification system might make a query over a network 402 to registration system 212 about User N. The verification system might include with that query a user ID of user N and registration system 212 would be expected to respond with the full key associated with that user ID and a wavelength value for that user ID. The verification system would use that data to perform the comparison between the recombined key and the full key as well as comparing the wavelength value received from registration system 212 to the wavelength value detected when illuminating the hologram on access card 209. Upon a match, the verification system would issue an access/no access signal to a secured resource 404.

Secured resource 404 might be for physical access to a safe deposit box, a military installation, a room containing trade secrets and/or confidential data, office building, etc. Secured resource 404 might be an online resource, such as access to online servers, data, or computing devices. Secured resource 404 might be a controller for a door lock, safe door, logical electronic barrier to information, or similar.

Secured resource 404 might also be used to control access to a cloud network for operations, or secured resource 404 might be used over a cloud network for remote processing or remote or local access to resources such as printers, rooms, buildings.

Other examples of security barriers include locked doors, electronically controlled passageways, program code that blocks access, at times, to data stored in storage. Granting access might involve unlocking doors, opening up other barriers, providing requested data, etc.

Figure 5:
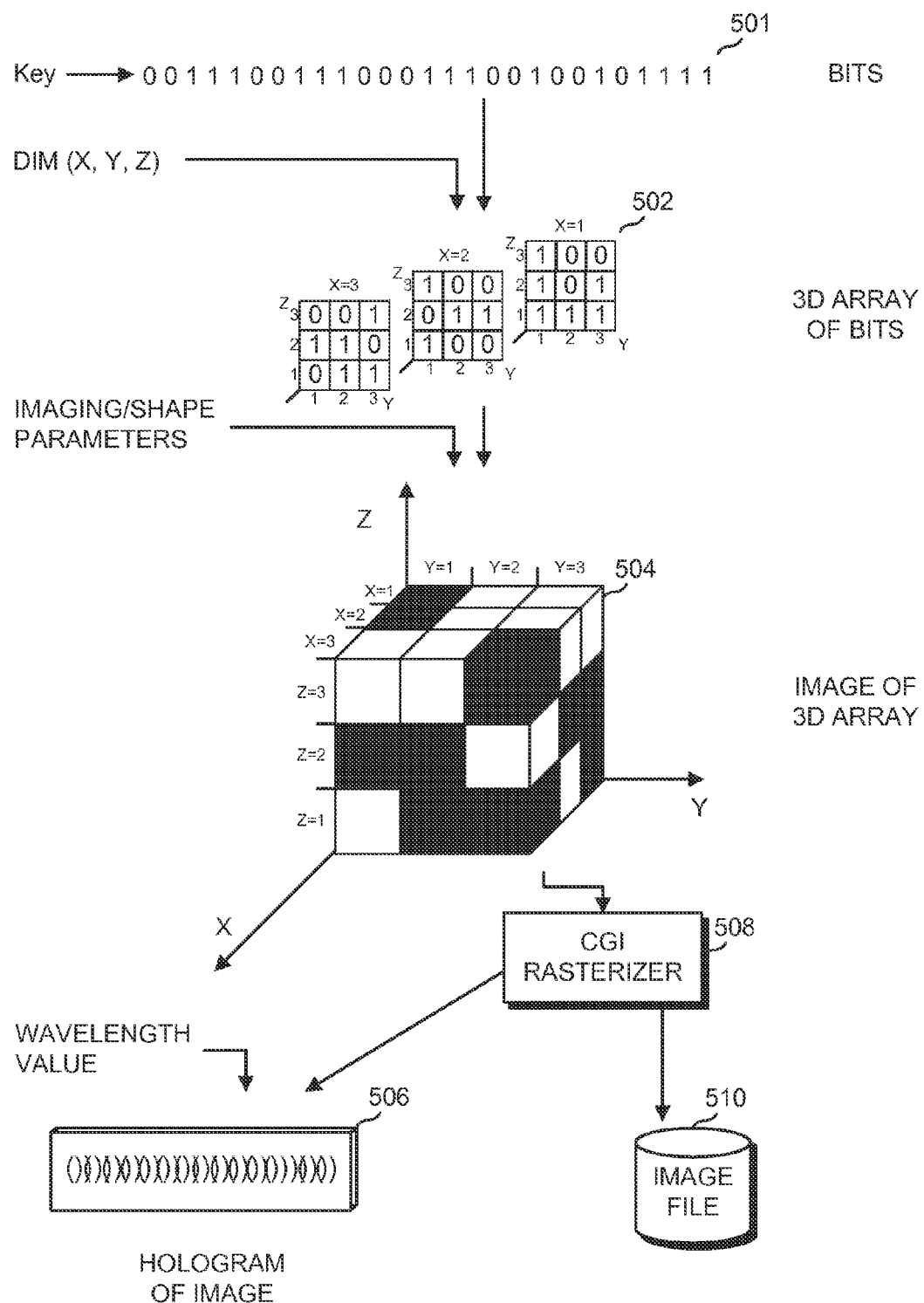
FIG. 5 illustrates different forms of that are representable as data and metadata, or as images corresponding to that data and corresponding metadata.

FIG. 5 illustrates different forms of keys and applies to full keys, user keys, complimentary keys, recombined keys, and others keys that are representable as data and metadata, or as images corresponding to that data and corresponding metadata.

In FIG. 5, a key 501 is shown as a 27-bit binary sequence for illustrative purposes. This number was selected for ease of understanding the drawings, but it should be understood that secure keys are typically larger than 27 bits. For example, keys can be specified as 1,000 bits, 4,096 bits, or even some number that is not a cube of an integer. The operations illustrated by FIG. 5 can be performed in a computing system and/or an optics system, such as the apparatus described herein, or other apparatus.

It should also be understood that certain keys used in systems and methods described herein can include an idle state value in place of a binary bit value.

There are a number of ways to store a representation of key 501. It can be stored as interference patterns on a photographic substrate, thus forming a hologram. It can be stored as data in an image file format (which can be the data of key 501 directly, or an image of a geometric model in a virtual space that is constructed according to key 501). The image file format may include space for metadata about the image.

Methods for generating an image corresponding to the bit sequence of key 501 will now be described. In this example, there is some metadata used in the creation of the image that does not need to be derived from key 501, such as dimensional extents, imaging/shape parameters and, in the case of recording as a hologram, a wavelength value. Generally, the methods would be such that a useful amount of key 501 can be recovered from the image data or hologram.

In one method, an image corresponding to key 501 is recorded and key 501 can be recovered from an examination of the image or image data. A specific example of that method will now be described. The method might be performed by a CGI module of user card printer 208 and/or by a CGI program executed by processor 312, collectively referred to herein as a "CGI processor".

A CGI processor 508 uses as inputs the value of key 501 and values of metadata including dimension extents, imaging parameters, shape parameters and possibly other metadata. The imaging parameters might specify a camera viewpoint, a camera view frame, scale, and pixel resolution. The shape parameters might specify a unit shape (cube, sphere, etc.), color maps (e.g., "0" corresponds to a white unit shape, "1" corresponds to a black unit shape, and an idle state value corresponds to a transparent unit shape), spacing between unit shapes, size of unit shapes, and relative placement of unit shapes.

Some of these imaging/shape parameters might be fixed throughout the access control system, in which case they can be hard-coded. In other implementations, these are variable from user to user, key to key, and/or image to image and their values are provided from elsewhere. As an example, those variable values might be randomly generated and stored as image metadata in an image file.

In the example shown, the dimension extents are from 1 to 3 in each dimension, which might be expressed as Dim(3, 3, 3). Different dimension extents might also be used with the 27-bit key, such as Dim(1, 9, 3) or Dim(27, 1, 1). As should be understood, an array of values can have a dimension (such as three), an extent in each of those dimensions (such as 1, 3, 9, 27, etc.), and values in each cells of the array with each cell having a unique index within the array. For example, the first encountered cell of the array might have an index of (1, 1, 1) and the next one having an index of (1, 1, 2). Index values might start with zero or one.

For illustrative purposes, when details of the values of the 3D array are shown, a 3×3×3 array is shown. However, it should be understood that 27 bits might not be enough to ensure security, so a more typical 3D array might be larger. Some examples include a 10×10×10 array (1,000 bits) or a 16×16×16 array (4,096 bits). As mentioned above, the dimensions do not need to be the same on all axes. For example, a 50×40×5 array (10,000 bits) might be used or a 60×60×1 array (3,600 bits) might be used.

CGI processor 508, having that metadata, can physically or logically arrange the bits of key 501 into a data structure that has three dimensions. An example of that is the data structure 502, which can be obtained by arranging the bits of key 501 into a 3D array of values selected from the set {0, 1}, filling in from square to square from left to right, starting with the upper left cell of the left-most square of data structure 502.

Each of the cells in the 3D array of values can correspond to a position in a virtual 3D space, where the position in that space corresponds to a point with co-ordinates that correspond to a 3D array index for the cell in the 3D array of values. As can be seen in FIG. 1, the "0"s and "1"s of the left-most square of data structure 502 correspond to the X=3 plane of cubes in image 504. Similarly, the middle square of data structure 502 corresponds to the X=2 plane of cubes in image 504 and the right-most square of data structure 502 corresponds to the X=1 plane of cubes in image 504. The unit shapes and their colors can be different than what is shown, but in this example, the unit shapes are cubes, they are space-filling (e.g., they are placed so that there is not unused space between them), and they are colored black or white with black edges.

This virtual image might be logically constructed as a virtual ensemble of unit shapes that is then rendered to a camera viewpoint (or a range of camera viewpoints, where CGI holograms are concerned). CGI processor 508 then rasterizes the virtual image into a pixel array that can be stored as image data or as interference patterns that can be recorded as a hologram.

In some implementations, the unit shapes are not arranged in a 3D grid, but are arranged to that each of the unit shapes are visible in the image. One way to have this happen is to select unit shape positions relative to the camera viewpoint such that no unit shape is entirely obscured by other unit shapes. Another way is to store the image as a volumetric image.

In the general case, some image component feature is used to indicate an image component corresponding to a "0" in the 3D array of values. This is referred to as a "0" state valued image component. A different image component feature is used to indicate an image component corresponding to a "1" in the 3D array of values. This is referred to as a "1" state valued image component. Yet a third image component feature, or the absence of one of the other two image component features, can be used to signal or represent an idle state value. That is referred to as an idle state valued image component.

Alternatively, the resulting image can be represented by a file in memory or other storage, the file comprising a number of bits and/or bytes in an image file format. The image file format might be a known image file format. In an image file according to some image file formats, the image file has a sequence of bits, bytes, strings, etc. corresponding to image values and then possibly additional sequences of bits, bytes, strings, etc. that are "metadata" about the image. Image 504 might be recorded as a hologram 506 onto photographic media, possibly using conventional holographic recording techniques, to generate interference patterns and expose the photographic media accordingly. Hologram 506 is recorded onto the photographic media using a particular wavelength of light, which can be within the visible spectrum or outside the visible spectrum.

The particular wavelength of light used might be variable from user to user or from use to use and can be specified by a wavelength value input to the hologram generation process. As is often the case, hologram 506 might be recorded using a particular wavelength of light such that reading an image from hologram 506 might require illumination with that particular wavelength of light.

Figure 6:
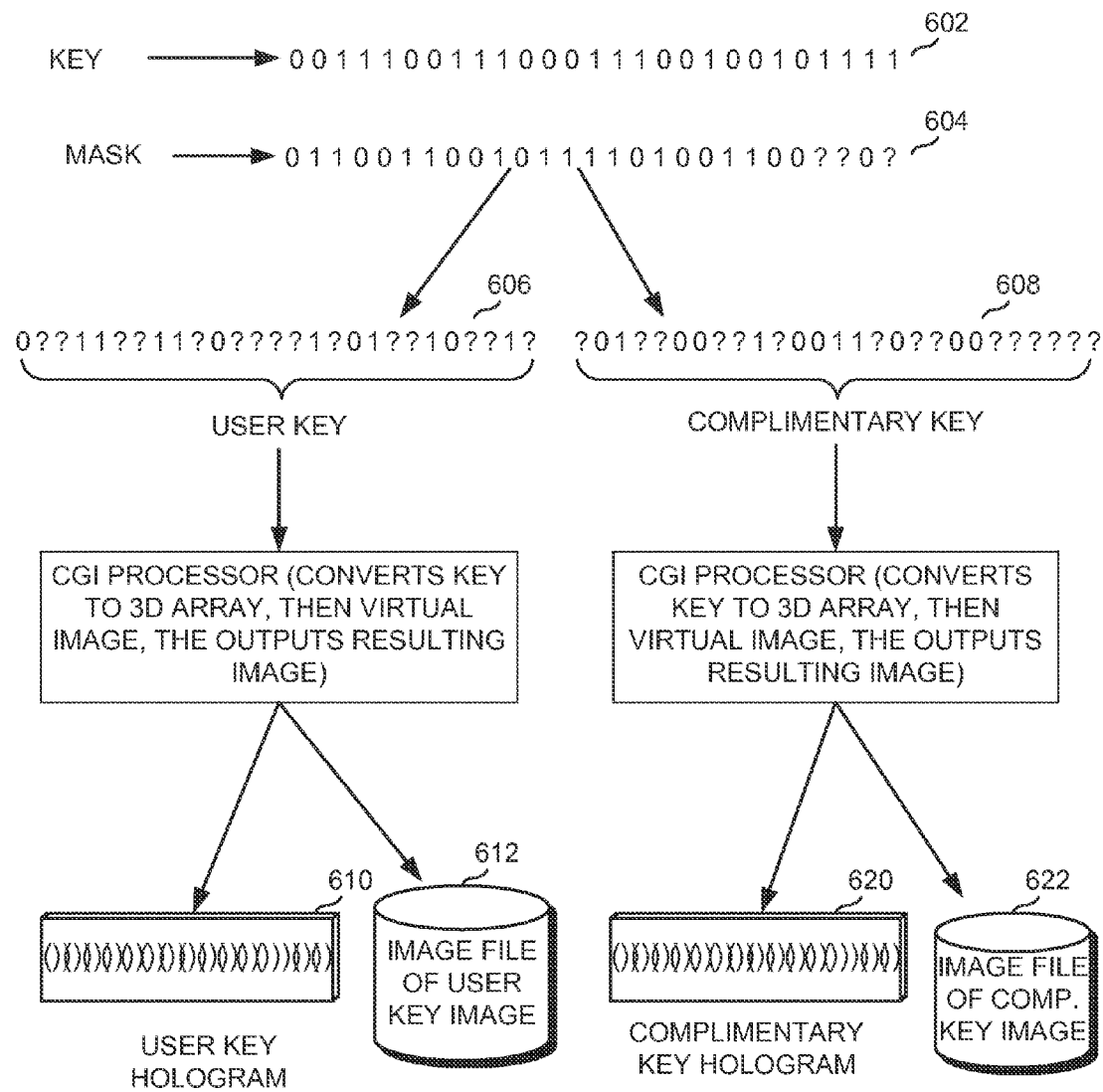
FIG. 6 illustrates how the encodings of a key might be used in a security system.

FIG. 6 illustrates how the encodings of a key might be used in a security system. In FIG. 6, a key 602 is represented as a 27-bit number. This number was selected for ease of understanding the drawings, but it should be understood that secure keys are typically larger than 27 bits, as explained herein. Using a mask 604, also a 27-bit number, key 602 can be split into two split keys, a user key 606 and a complimentary key 608. This can be performed using the appropriate apparatus. As illustrated, the "0" and "1" values of the mask determine whether corresponding bits of key 602 go to user key 606 or to complimentary key 608. This results in user key 606 and complimentary key 608 being 27-element strings or sequences with elements from the set {0, 1, ?}, where "?" indicates the idle state in the split key. Where a position in mask 604 has the "?" value, that position in both of the split keys has the "?" value. Thus, not all of the components of key 602 need be copied to one of the split keys.

In a more general case, the mask comprises a sequence of masking values selected from a masked value, an unmasked value and an idle state value. In that case, considering the values at corresponding locations in the key, the mask, the user key, and the complimentary key, if the corresponding value of the mask is the masked value, the corresponding value of the user key is the idle state value and the corresponding value of the complimentary key is the key value, whereas if the corresponding value of the mask is the unmasked value, the corresponding value of the user key is the key value and the corresponding value of the complimentary key is the idle state value. If the corresponding value of the mask is the idle state value, the corresponding values of both the user key and the complimentary key are the idle state value.

As with the key illustrated in FIG. 5, these split keys can be represented as 3D arrays of values, but with elements from the set {0, 1, ?}. In the case where the dimensions of the 3D array (such as an M×N×P matrix) are not fixed throughout the security system, the dimension extents (matrix dimensions) can be supplied as an input. A hologram of each split key (the user key and the complimentary key) can be formed on a substrate according to a CGI object or a physical object corresponding to their values. One 3D array can be the user key array while another 3D array is the complimentary key array.

In a security testing operation, the partitions of representations of the split keys are merged and the resulting recombined key is compared to a copy of the full key in a matching process described below. FIG. 7 is a table illustrating different types of superposition that might be used in a security system to merge split keys for use in matching. As illustrated there, the combination can be done in different domains allowing for combinations of different representations. For example, the split keys (e.g., the user key and the complimentary key) can be merged as bit values, as arrays, as digital images, or as holograms to form merged sequences, merged arrays, merged images, or merged holograms.

If the split keys are represented as strings (or other sequential or linear arrangements) of elements from the set {0, 1, ?} with a length of 27, the split keys can be merged into a recombined key using bitwise merging along the string/sequential position.

If the split keys are represented as images in a 3D virtual space, they can be represented as geometric models or as rasterized volumetric images. As a geometric model, each split key is represented as an ensemble of cubes and idle states and the merging is an alignment of those elements into one geometric model of an ensemble corresponding to the recombined key. For example, an ensemble might comprise a collection of white cubes corresponding to "0" values, black cubes corresponding to "1" and transparent cubes corresponding to idle states.

As a rasterized volumetric model, each split key is represented by a 3D voxel array and the merging is done in a similar manner, except it is done on a voxel-by-voxel basis. Where the merging is not expected to result in an exact reconstruction, the matching of the recombined key can be relaxed so that a 100% match is not required.

In the case of hologram superposition, a hologram of the user key and a hologram of the complimentary key are optically superimposed to arrive at the recombined key. This may use a TLS. If the same wavelength is used for both the user key and the complimentary key, the light outgoing from the TLS can be split using a 50/50 beam splitter, which will have two identical rays illuminate both the complimentary key substrate and the user key substrate. If different wavelengths are used, a module with two TLSs embedded is used. The TLSs are synchronized to ensure that both substrates are illuminated during the same time frame. Both substrates in either case should be aligned for proper superposition of the holograms.

Figure 8:
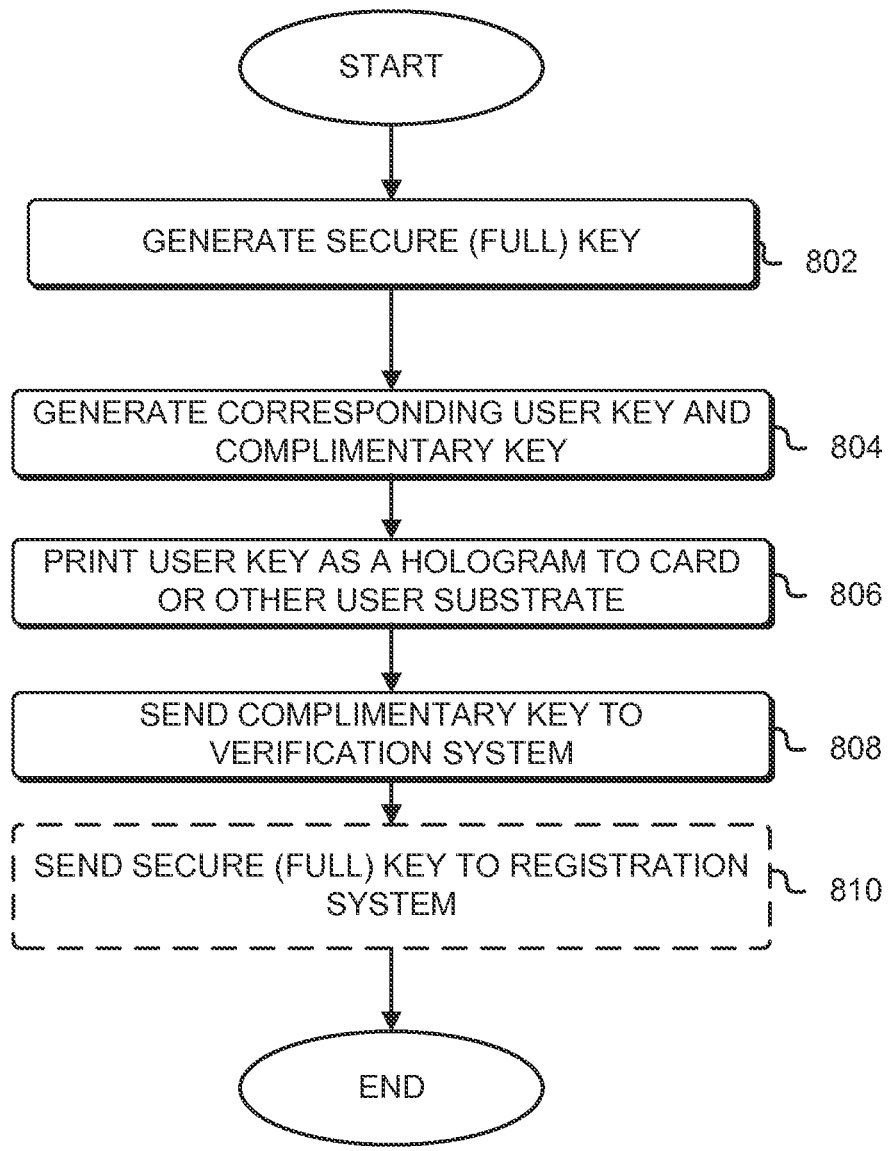
FIG. 8 is a flowchart of a process that a security system might use to populate the security system with its users.

FIG. 8 is a flowchart of a process that a security system might use to populate the security system with its users. In that process, first a secure full key is generated (step 802), then corresponding user key image and a complimentary key image are created (step 804). These might be generated as illustrated elsewhere herein.

The user key image is sent to a user card printer (step 806). Note that instead of a card, such as a credit card sized card, other substrates for the image might be used. That user key image can be imprinted on the card/substrate as a hologram. The complimentary key image is sent to a verification database system (step 808). An image corresponding to the secure full key might also be generated and sent to a registration system.

Figure 9:
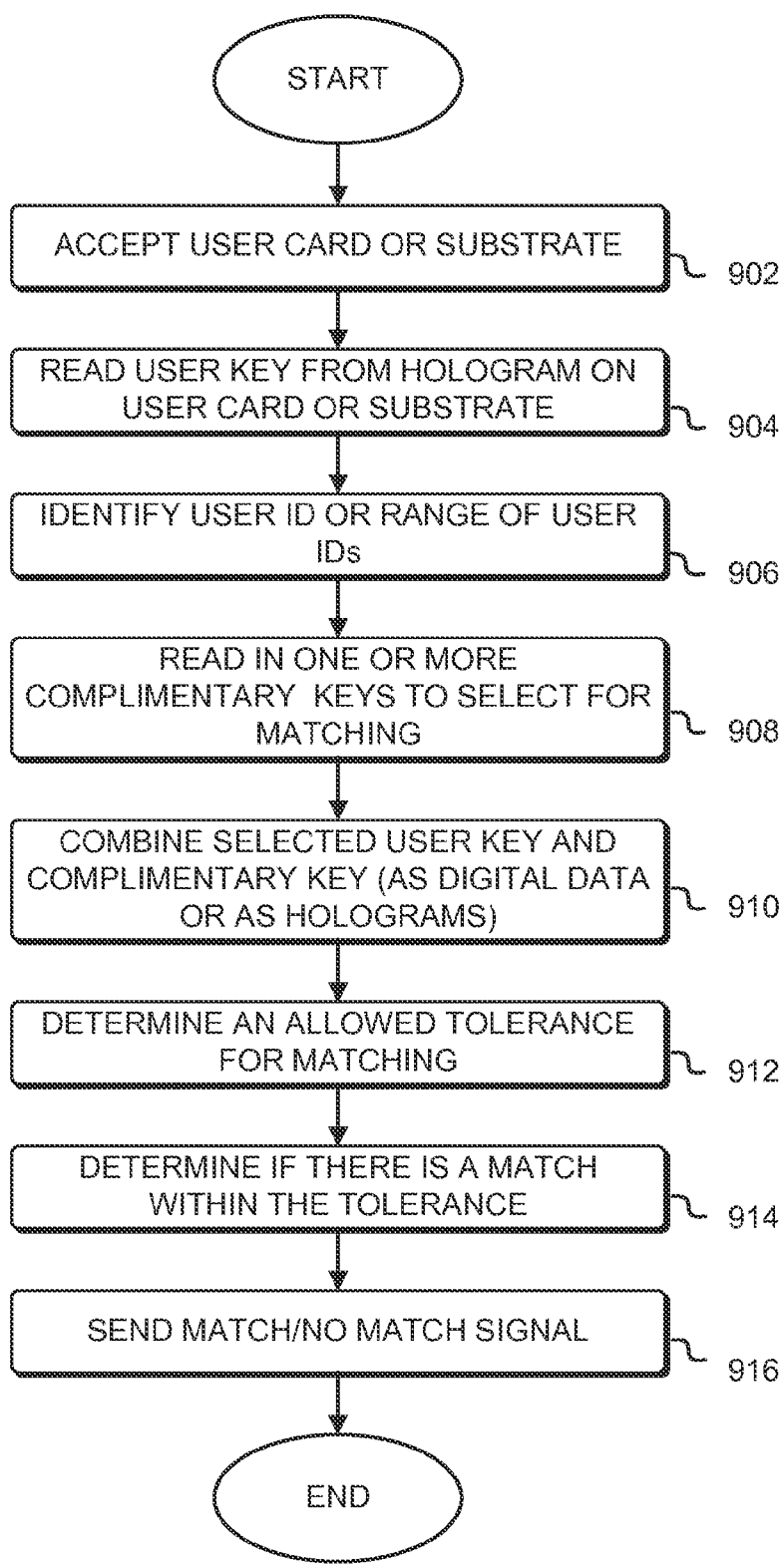
FIG. 9 is a flowchart of a process that a security system might use to verify access devices and control access to secured resources.

FIG. 9 is a flowchart of a process that a security system might use to verify access devices and control access to secured resources. With that process, a partial image can be used to obtain access to secured locations and/or resources.

In step 902, a security evaluator or integrated security system reads a user's access card or substrate. This might occur when a card reader senses the presence of a card or substrate containing a hologram. In step 904, a card reader or other device reads or interprets the user key from that hologram. From that information, a verification system identifies a user ID (step 906), reads in one or more complimentary keys to select for match processing (908), then merges the selected user key data, image, or hologram with the complimentary key data, image, or hologram (910) to form a recombined key. The verification system determines an allowed tolerance for matching (912), and determines whether there is a match within the tolerance (914). If there is a match within the tolerance, the verification system sends a match signal, otherwise sends a no-match signal (step 916.)

If this match/no-match signal is provided to a secured resource, that secured resource can be unlocked for a match and not unlocked for a no-match event, possibly also sending notifications.

Figure 10:
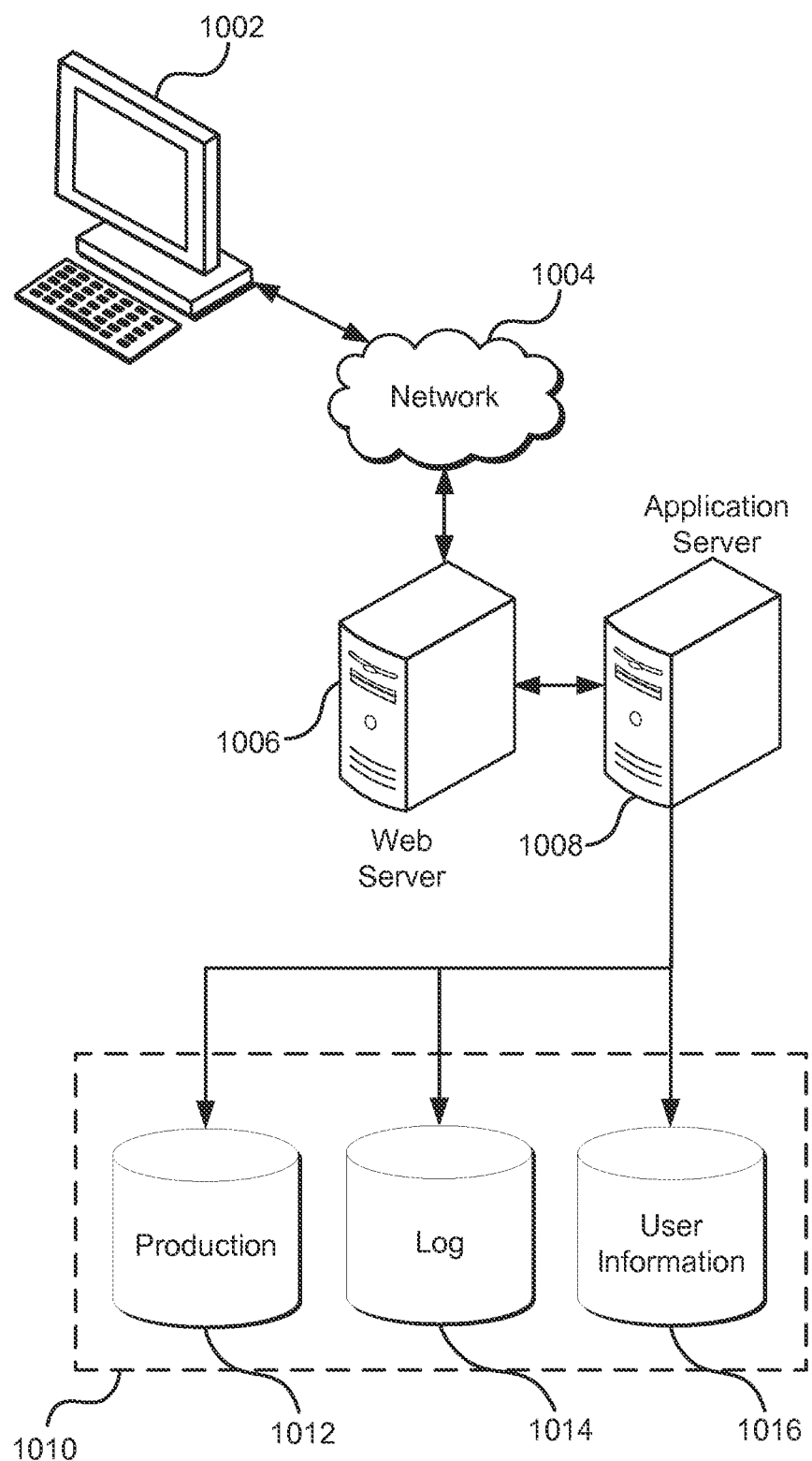
FIG. 10 illustrates an environment in which various embodiments can be implemented.

FIG. 10 illustrates aspects of an example environment for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The computer-readable storage medium might be a non-transitory computer-readable storage medium.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), and Common Internet File System ("CIFS"). The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative view rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method of controlling access to secured resources using a security token having a hologram thereon, the method comprising:
 1) under control of one or more computer systems configured with executable instructions, a) generating a full key comprising a sequence of bits, wherein a sequence is such that each element in the sequence has a position in the sequence, and wherein each bit of the full key has a value that is in the set {"0", "1"};

b) generating a mask comprising a sequence of masking values, wherein each of the masking values has a position in the mask and a value that is in a set comprising a masked value of "1" and an unmasked value of "0";

c) generating a user key, comprising a first sequence of digital values, from the full key and the mask, such that, at each position of the sequence of the user key, the digital value is the value at a corresponding position in the full key if the value at a corresponding position in the mask is the unmasked value of "0" and the digital value is an idle state value of "?" if the value at the corresponding position in the mask is the masked value of "1"; and d) generating a complimentary key, comprising a second sequence of digital values, from the full key and the mask, such that, at each position of the sequence of the complimentary key, the digital value is the value at a corresponding position in the full key if the value at a corresponding position in the mask is the masked value of "1" and the digital value is the idle state value of "?" if the value at the corresponding position in the mask is the unmasked value of "0";

2) illuminating a first substrate by a first selected wavelength of light;

3) forming a first hologram on the first substrate such that a first readable image encoded in the first hologram corresponds to the user key;

4) attaching the first substrate to the security token so that the first hologram is readable from the first substrate by an access card reader when the security token is inserted into the access card reader;

5) illuminating a second substrate by a second selected wavelength of light; and 6) forming a second hologram on the second substrate such that a second readable image encoded in the second hologram corresponds to the complimentary key.

2. The method of claim 1, further comprising:
under the control of the one or more computer systems configured with the executable instructions, e) obtaining the first readable image from the first substrate attached to the security token, using the access card reader;

f) obtaining the second readable image from the second substrate, wherein the second substrate is available at a verification system;

g) merging the first readable image with the second readable image to form a recombined image such that an idle state valued image component in the first readable image is overlaid with an image component from the second readable image;

h) converting the recombined image into a recombined key comprising a recombined sequence of digital values each of which are in the set {"0", "1", "?"} according to the image components of the recombined image;

i) comparing the recombined sequence of digital values to the full key to determine whether they match, wherein a match occurs if each of the "0" and "1" values in the recombined sequence of digital values corresponds to "0" and "1" bits in corresponding positions in the full key; and j) sending an access control signal indicating that access to the secured resources should be granted upon confirmation of a match.

3. The method of claim 1, further comprising:
under the control of the one or more computer systems configured with the executable instructions, e) generating a geometric model of the user key, wherein the geometric model of the user key comprises cubes arranged in three dimensions in a first virtual space in an ensemble corresponding to the user key with co-ordinates in the first virtual space of each cube corresponding to a position of the user key and having a cube color corresponding to the digital value at that position of the user key;

f) generating a geometric model of the complimentary key, wherein the geometric model of the complimentary key comprises cubes arranged in three dimensions in a second virtual space in an ensemble corresponding to the complimentary key with co-ordinates of each cube corresponding to a position of the complimentary key and having a cube color corresponding to the digital value at that position of the complimentary key;

g) generating a geometric model of the full key, wherein the geometric model of the full key comprises cubes arranged in three dimensions in a third virtual space in an ensemble corresponding to the full key with co-ordinates of each cube corresponding to a position of the full key and having a cube color corresponding to the digital value at that position of the full key;

h) using the geometric model of the user key in forming the first hologram; and i) using the geometric model of the complimentary key in forming the second hologram.

4. A system for controlling access to secured resources using a security token having a hologram thereon, the system comprising:
at least one computing device configured to implement one or more services, wherein the one or more services are configured to:

a) generate a full key comprising a sequence of digital values, wherein a sequence comprises a plurality of elements each having a position within the sequence;

b) generate a mask comprising a sequence of masking values, wherein each of the masking values has a position in the mask and is a masked value or an unmasked value; and c) partition the full key into two split keys, a user key and a complimentary key, using the mask, such that the user key comprises a sequence of digital values each having a position in the user key and at each position of the sequence of the user key, the digital value is the value at a corresponding position in the full key if the value at a corresponding position in the mask is the unmasked value and the digital value is an idle state value if the value at the corresponding position in the mask is the masked value and the complimentary key comprises a sequence of digital values each having a position in the complimentary key and at each position of the sequence of the complimentary key, the digital value is the value at a corresponding position in the full key if the value at a corresponding position in the mask is the masked value and the digital value is the idle state value if the value at the corresponding position in the mask is the unmasked value; and a hologram generator capable of:
- a) forming a first hologram on a first substrate attached to the security token such that a first readable image encoded in the first hologram corresponds to the user key and wherein the first hologram is formed using illumination of the first substrate by a first selected wavelength of light and is readable by an access card reader; and
- b) forming a second hologram on a second substrate such that a second readable image encoded in the second hologram corresponds to the complimentary key and wherein the second hologram is formed using illumination of the second substrate by a second selected wavelength of light.

5. The system of claim 4, further comprising the access card reader, wherein the access card reader is configured for:
obtaining the first readable image from the security token using a tunable laser; and
obtaining the second readable image from the second substrate, wherein the second substrate is available at a verification system and is read using the tunable laser.

6. The system of claim 5, wherein the one or more services are further configured to:
merge the first readable image with the second readable image, at the verification system, to form a recombined image such that idle state valued image components in the first or second readable image are overlaid with other valued image components from the first or second readable image;
convert the recombined image into a recombined key;
compare the recombined key with the full key according to matching criteria to determine whether there is a match; and
send an access control signal indicating that access to the secured resources should be granted upon confirmation of a match.

7. The system of claim 4, wherein the one or more services are further configured to:
generate a geometric model of the user key in three dimensions in a first virtual space, wherein the geometric model of the user key comprises image components arranged in an ensemble corresponding to the user key with co-ordinates of each image component corresponding to a position of the user key and that image component having a feature corresponding to the digital value at that position of the user key;
generate a geometric model of the complimentary key in three dimensions in a second virtual space, wherein the geometric model of the complimentary key comprises image components arranged in an ensemble corresponding to the complimentary key with co-ordinates of each image component corresponding to a position of the complimentary key and that image component having a feature corresponding to the digital value at that position of the complimentary key;
generate a geometric model of the full key in three dimensions in a third virtual space, wherein the geometric model of the full key comprises image components arranged in an ensemble corresponding to the full key with co-ordinates of each image component corresponding to a position of the full key and that image component having a feature corresponding to the digital value at that position of the full key;
use the geometric model of the user key in forming the first hologram;
use the geometric model of the complimentary key in forming the second hologram; and
use the geometric model of the full key for comparing against a geometric model of a recombined key formed by combining, at a verification system, the geometric model of the user key obtained from the first hologram, read from the first substrate attached to the security token, and the geometric model of the complimentary key obtained from the second hologram.

8. The system of claim 7, wherein the first virtual space, the second virtual space, and the third virtual space are logically and/or functionally indistinct.

9. The system of claim 7, wherein the feature is color and each of the digital values in the user key or complimentary key correspond to white cubes or black cubes and idle state values correspond to transparent cubes in an ensemble of cubes.

10. The system of claim 4, wherein not all security tokens use the same imaging/shape parameters.

11. The system of claim 4, wherein not all security tokens use the same first selected wavelength.

12. The system of claim 4, wherein the first selected wavelength of light is a different wavelength than the second selected wavelength of light.

13. The system of claim 4, wherein the first selected wavelength is not determinable, with less than a threshold amount of effort, from the second hologram.

14. A non-transitory computer-readable storage medium having stored thereon executable instructions that, when executed by one or more processors of a computer system, cause the computer system to at least:
- a) generate a full key comprising a sequence of digital values, wherein a sequence comprises a plurality of elements each having a position within the sequence;
- b) generate a mask comprising a sequence of masking values, wherein each of the masking values has a position in the mask and is a masked value or an unmasked value; and
- c) partition the full key into two split keys, a user key and a complimentary key, using the mask, such that the user key comprises a sequence of digital values each having a position in the user key and at each position of the sequence of the user key, the digital value is the value at a corresponding position in the full key if the value at a corresponding position in the mask is the unmasked value and the digital value is an idle state value if the value at the corresponding position in the mask is the masked value and the complimentary key comprises a sequence of digital values each having a position in the complimentary key and at each position of the sequence of the complimentary key, the digital value is the value at a corresponding position in the full key if the value at a corresponding position in the mask is the masked value and the digital value is the idle state value if the value at the corresponding position in the mask is the unmasked value;
- d) send instructions to a hologram generator to form a first hologram on a first substrate of an access card used to control access to secured resources such that a first readable image encoded in the first hologram corresponds to the user key and wherein the first hologram is formed using illumination of the first substrate by a first selected wavelength of light; and
- e) send instructions to the hologram generator to form a second hologram on a second substrate such that a second readable image encoded in the second hologram corresponds to the complimentary key and wherein the second hologram is formed using illumination of the second substrate by a second selected wavelength of light.

15. The non-transitory computer-readable storage medium of claim 14, having stored thereon further executable instructions that, when executed by one or more processors of a computer system, cause the computer system to at least:
   obtain the first readable image from the first substrate on the access card;
   obtain the second readable image from the second substrate, wherein the second substrate is available at a verification system;
   merge the first readable image with the second readable image, at the verification system, to form a recombined image such that idle state valued image components in the first or second readable image are overlaid with other valued image components from the first or second readable image;
   convert the recombined image into a recombined key;
   compare the recombined key with the full key according to matching criteria to determine whether there is a match; and
   send an access control signal indicating that the access to the secured resources should be granted upon confirmation of a match.

16. The non-transitory computer-readable storage medium of claim 14, having stored thereon further executable instructions that, when executed by one or more processors of a computer system, cause the computer system to at least:
   generate a geometric model of the user key in three dimensions in a first virtual space, wherein the geometric model of the user key comprises image components arranged in an ensemble corresponding to the user key with co-ordinates of each image component corresponding to a position of the user key and that image component having a feature corresponding to the digital value at that position of the user key;
   generate a geometric model of the complimentary key in three dimensions in a second virtual space, wherein the geometric model of the complimentary key comprises image components arranged in an ensemble corresponding to the complimentary key with co-ordinates of each image component corresponding to a position of the complimentary key and that image component having a feature corresponding to the digital value at that position of the complimentary key;
   generate a geometric model of the full key in three dimensions in a third virtual space, wherein the geometric model of the full key comprises image components arranged in an ensemble corresponding to the full key with co-ordinates of each image component corresponding to a position of the full key and that image component having a feature corresponding to the digital value at that position of the full key;
   use the geometric model of the user key in forming the first hologram;
   use the geometric model of the complimentary key in forming the second hologram; and
   use the geometric model of the full key for comparing against a geometric model of a recombined key formed by combining, at a verification system, the geometric model of the user key obtained from the first hologram, read from the first substrate attached to the security token, and the geometric model of the complimentary key obtained from the second hologram.

17. The non-transitory computer-readable storage medium of claim 16, wherein the executable instructions are such that the first virtual space, the second virtual space, and the third virtual space are logically and/or functionally indistinct.

18. The non-transitory computer-readable storage medium of claim 16, wherein the executable instructions are such that the feature is color and each of the digital values in the user key or complimentary key correspond to white cubes or black cubes and idle state values correspond to transparent cubes in an ensemble of cubes, not all security tokens use the same imaging/shape parameters, and not all security tokens use the same first selected wavelength.

19. The non-transitory computer-readable storage medium of claim 14, wherein the executable instructions are such that the first selected wavelength of light is a different wavelength than the second selected wavelength of light.

* * * * *